May 12, 1970      P. SAMMARCO      3,511,399
FORAGE FEEDER

Filed May 14, 1968      4 Sheets-Sheet 1

INVENTOR
PETER SAMMARCO
BY Neal C. Johnson
ATT'Y.

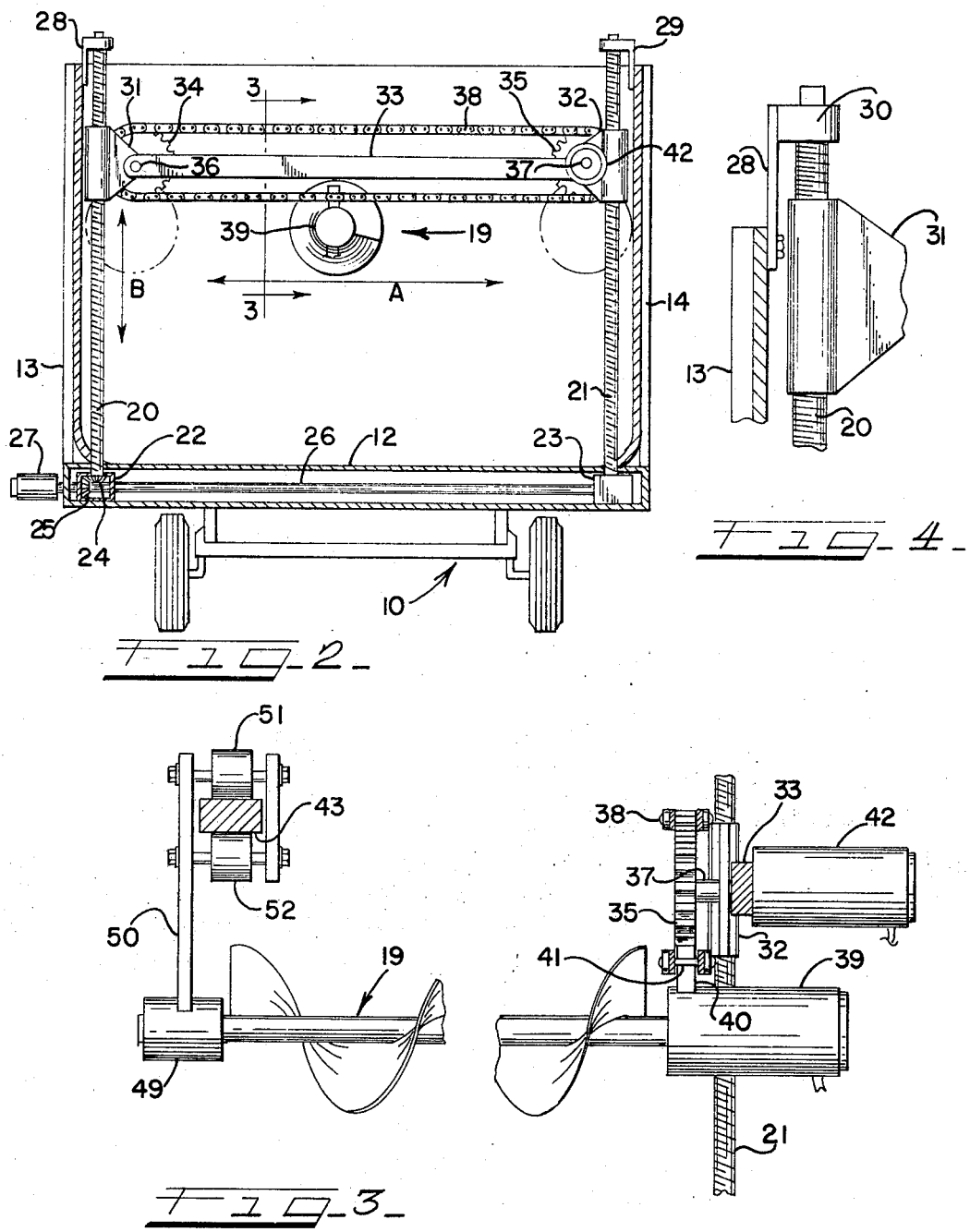

May 12, 1970 P. SAMMARCO 3,511,399
FORAGE FEEDER
Filed May 14, 1968 4 Sheets-Sheet 3
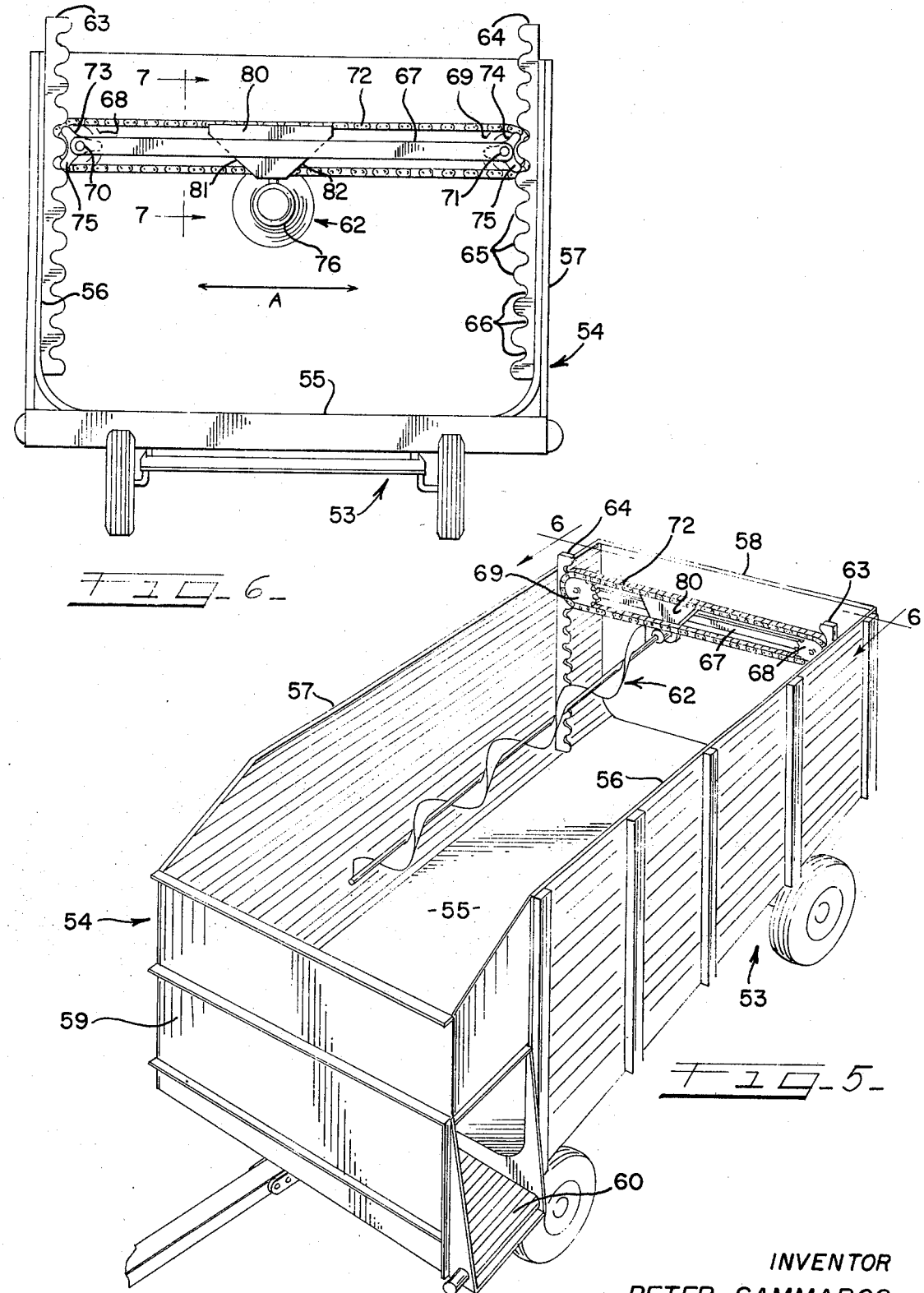
INVENTOR
PETER SAMMARCO
BY Neal C. Johnson
ATT'Y.

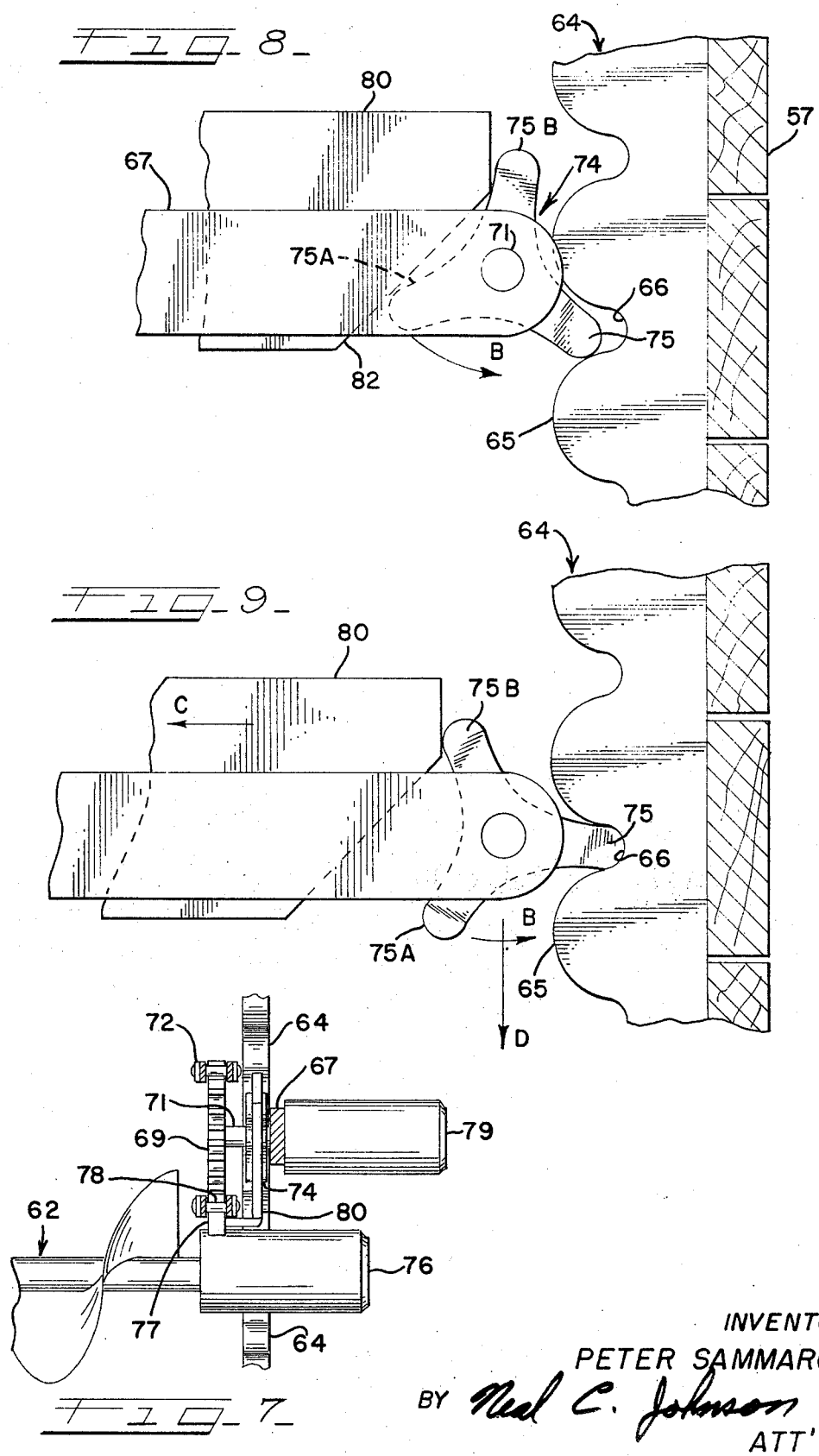

United States Patent Office 3,511,399
Patented May 12, 1970

3,511,399
FORAGE FEEDER
Peter Sammarco, Bellwood, Ill., assignor to International Harvester Company, Chicago, Ill., a corporation of Delaware
Continuation-in-part of abandoned application Ser. No. 589,595, Oct. 26, 1966. This application May 14, 1968, Ser. No. 728,974
Int. Cl. B60p 1/42
U.S. Cl. 214—520
14 Claims

ABSTRACT OF THE DISCLOSURE

A self-unloading wagon having a power operated auger extending longitudinally along the wagon, above the load of forage to be unloaded from the wagon. The auger is operable to convey the forage from the top of the load toward a cross conveyor extending across the bottom of the wagon. The cross conveyor is arranged to unload the forage through a side wall of the wagon. Means are provided for moving the auger vertically and transversely with respect to the wabon so as to convey the forage from the top of the load onto the cross conveyor in a uniform flow.

CROSS REFERENCE TO RELATED APPLICATION

This application is a continuation-in-part of applicant's co-pending application Ser. No. 589,595 entitled Forage Feeder, filed Oct. 26, 1966, now abandoned.

BACKGROUND OF THE INVENTION

Field of the invention

This invention relates generally to unloading apparatus for farm wagons. More particularly, it is concerned with a self-unloading forage feeder including conveyor means associated with the top of material such as grain or forage transportable in the wagon for unloading the material from the wagon in an efficient manner.

Description of the prior art

Conventional forage wagons generally include a chain and slat type conveyor mounted on the floor of the forage wagon and operable to move a load of forage forwardly toward a system of shredders or beaters and a cross conveyor. The chain and slat type conveyor must be designed to withstand forces encountered in moving the entire load of forage toward the beaters and the cross conveyor. Moreover, any conveyor, whether chain and slat type or otherwise, which is disposed beneath the load, requires a very considerable amount of power to operate. Due to the fact that the chain and slat type conveyor is disposed on the floor of the wagon, it is also subject to freezing and binding. Another problem relates to the difficulty of repairing or replacing the conveyor. If the chain and slat type conveyor fails during unloading, then the load of forage must be manually unloaded to expose the conveyor for any necessary repair or replacement.

A further disadvantage associated with conventional forage wagons relates to the need for a plurality of rotatable beaters disposed horizontally in vertically spaced relation proximate to the cross conveyor. These beaters are required to shread the forage from the load being moved by the chain and slat type conveyor so that the forage will fall uniformly onto the cross conveyor. Besides requiring a power drive system, the beaters are difficult to position to maintain optimum shredding and unloading for all types of forage. This problem is exemplified in that it is common throughout the industry to provide forage wagons in two-beater and three-beater models in an attempt to provide optimum uniform unloading characteristics.

Moreover, the beaters present an obstruction to the normal flow of material into the wagon during the loading operation. The beaters also occupy space which could be used for material.

Conventional forage wagons are customarily power operated by means of a power take-off system from the pulling tractor. This system involves difficulties from the point of view of safety and moreover requires considerable time to couple and uncouple.

SUMMARY

Briefly, the invention relates to a self-unloading forage box adapted to contain a load of forage to be unloaded. The forage box includes an unloading mechanism which includes conveyor means in the box on top of the load of forage for conveying the forage longitudinally of the box toward an end thereof for unloading the forage from the box. The invention further includes means for moving the conveyor means within the forage box to maintain the conveyor means in conveying relation to the forage as the load level decreases.

The forage wagon of the invention solves may of the above mentioned problems by virtue of the conveyor means being disposed above the load of material to be unloaded from the wagon. Since the conveyor means is not buried beneath the load in the wagon, the entire load does not have to be moved by the conveyor means. Moreover, less power is required to drive the conveyor means. The conveyor means of the invention operates much more satisfactorily in freezing conditions in that it is not disposed proximate to the bottom of the wagon as in conventional practice. Moreover, the conveyor means is more readily accessible for purposes of repair or replacement when necessary. When using the conveyor means of the present invention, it is unnecessary that the entire load be moved to provide the access for repair or replacement.

A further important advantage is that the use of conventional beaters is entirely eliminated. The conveyor means of the invention provides the necessary material shredding and feeding action so as to provide a smooth flow of the material onto the cross conveyor for delivery from the wagon. Moreover, the elimination of the beaters provides more capacity per given box size and eliminates obstructions to the flow of material into the box during a loading operation.

The forage wagon of the invention is particularly well suited for powered operation through hydraulic power. Consequently, the conventional use of a power take-off drive system is eliminated.

With the foregoing in mind, it is accordingly an object of this invention to provide a self-unloading forage feeder having conveyor means which requires considerably less power and is under considerably less load than conventional forage feeder conveyors.

Another object of this invention is to provide a self-unloading forage feeder which need not be connected to the mechanical power take-off of an associated tractor.

Another object of this invention is to provide a self-unloading forage feeder having conveyor means which provides a shredding action on the material being unloaded, thereby eliminating the need for conventional beater assemblies.

A still further object of the invention is to provide a self-unloading forage wagon wherein the conveyor means is readily accessible for repair or replacement whether the wagon is loaded or empty.

BRIEF DESCRIPTION OF THE DRAWINGS

FIG. 2 is a sectional view taken generally in the direction of arrows 2—2 of FIG. 1;

FIG. 3 is a fragmentary sectional view taken generally in the direction of arrows 3—3 of FIG. 2;

FIG. 4 is a fragmentary view of a portion of the structure of the forage wagon of FIGS. 1 and 2;

FIG. 5 is a fragmentary perspective view of a modified form of the forage wagon of the invention;

FIG. 6 is an end elevation view taken generally in the direction of arrows 6—6 of FIG. 5;

FIG. 7 is a fragmentary sectional view taken generally in the direction of arrows 7—7 of FIG. 6;

FIG. 8 is an enlarged fragmentary view of a portion of the operating mechanism of FIGS. 5 and 6; and FIG. 9 is a view similar to FIG. 8 showing the operating mechanism in a subsequent operative step.

DESCRIPTION OF THE PREFERRED EMBODIMENT

Figure 1:
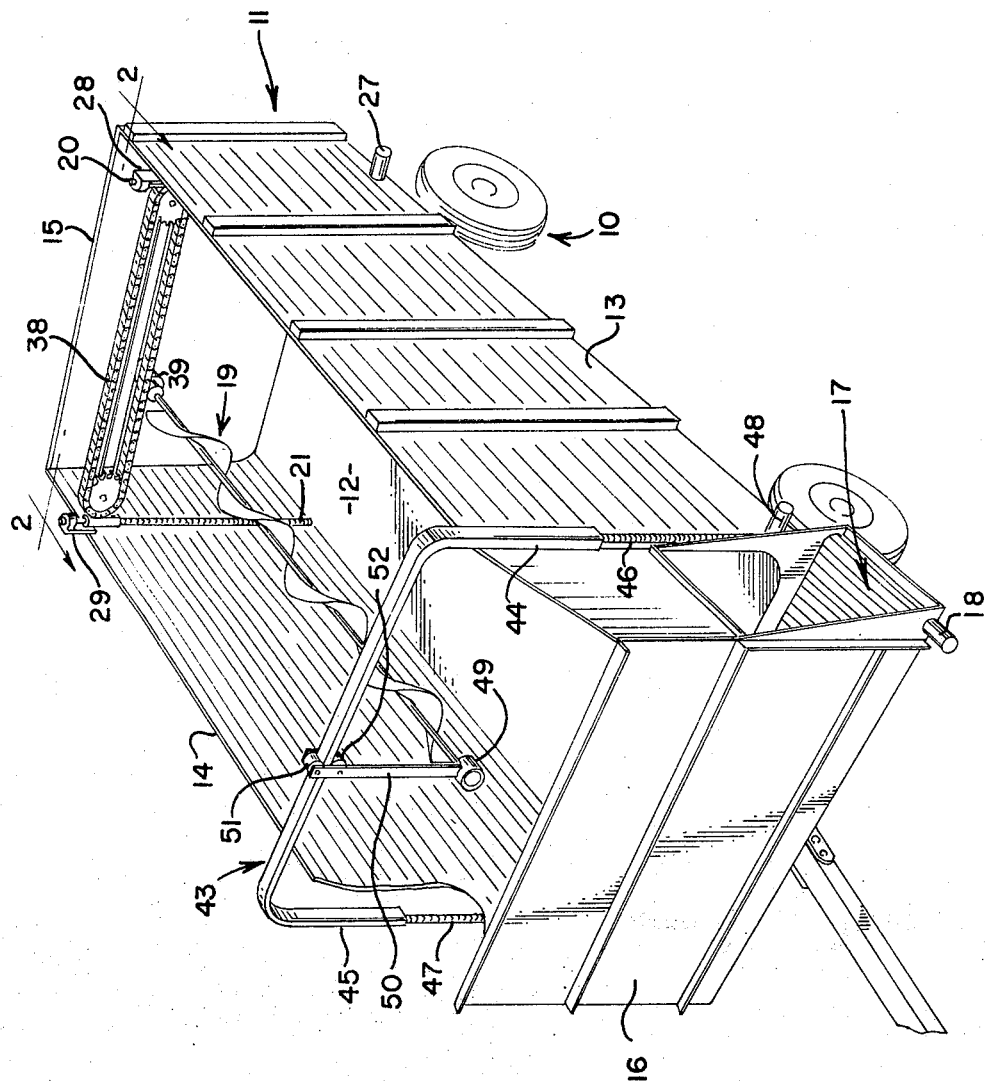
FIG. 1 is a fragmentary perspective view of the self-unloading forage wagon of the invention.

Referring now to the drawings, the improved forage feeder or wagon includes a wheeled chassis 10 on which a box 11 is mounted. The box 11 includes a floor 12 and side walls 13 and 14 oriented parallel to the longitudinal axis of the box. A rear wall 15 and front wall 16 close the ends of the box which may be constructed of conventional materials in accordance with conventional practice. A cross conveyor 17 is mounted across the bottom of box 11 proximate to the front end wall 16. The cross conveyor 17 may be of the slatted chain type or an auger type not shown or the belt type as illustrated and serves to discharge material from the forage wagon through the side wall 13, all in the conventional manner. In the preferred embodiment of the invention illustrated, the cross conveyor 17 is adapted to be powered by a hydraulic motor shown at 18.

In accordance with an important feature of the invention, an auger 19 is mounted on the box 11 and is disposed longitudinally with respect to the wagon. The auger 19 is adapted to be drivingly supported within the box 11 so as to be maintained in conveying relation with the material to be unloaded from the box. The assembly for drivingly supporting the auger 19 includes a pair of externally threaded screw shafts 20 and 21 extending upwardly through the floor 12 adjacent to the side walls 13 and 14, respectively. The shafts 20 and 21 are journaled in gear boxes 22 and 23, respectively, on the frame of the forage wagon.

The gear box 22 is cut away in FIG. 2 to reveal a bevel gear 24 mounted on the lower end of the screw shaft 20. The gear 24 is engaged with a bevel gear 25 mounted on a drive shaft 26 extending across the frame of the box 11 and through the gear box 22 as shown. It will be understood that the gear box 23 likewise encloses a pair of bevel gears engaged in the same manner as the gears 24 and 25. Accordingly, it will be seen that rotation of the drive shaft 26 causes concurrent rotation of each of the screw shafts 20 and 21. The drive shaft 26 is adapted to be driven by a hydraulic motor 27 mounted on the box frame as shown.

In order to maintain the screw shafts 20 and 21 in vertically disposed relation, supports 28 and 29 are suitably secured on the side walls 13 and 14, respectively, for receiving the upper ends of the screw shafts 20 and 21, respectively. As more clearly shown in FIG. 4, each of the supports 28 and 29 includes a bearing assembly 30 rotatably receiving the upper end of the respective screw shaft.

Internally threaded followers 31 and 32 are mounted on the externally threaded screw shafts 20 and 21, respectively. A bar 33 interconnects the followers 31 and 32 so that the same may be raised or lowered as a unit in response to rotation of the screw shafts 20 and 21.

Sprocket gears 34 and 35 are mounted on the followers 31 and 32, respectively for rotation about pins 36 and 37, respectively. In the preferred embodiment shown, the pins 36 and 37 also serve to connect the bar 33 to the followers 31 and 32. A chain 38 is trained about the sprocket gears 34 and 35 so as to extend across the body of the wagon as shown.

The auger 19 is adapted to be coupled to the above described structure so as to be movable vertically and transversely with respect to the wagon while being rotated about its longitudinal axis. As best shown in FIG. 3, a hydraulic motor 39 is coupled to the shaft of the auger 19 at the rearward end thereof. A boss 40 extends upwardly from the motor 39 so as to be coupled to the lower run of the chain 38 by means of a pin 41. As best shown in FIG. 3, a hydraulic motor 42 is mounted on the bar 33 and is arranged to rotate the pin 37. The sprocket gear 35 is coupled to the pin 37 such that operation of the motor 42 drives the gear 35. It will thus be seen with reference to FIG. 2 that operation of the motor 42 will cause the auger to move transversely within the box 11 in the direction of the double-headed arrow A. It will also be apparent that actuation of the hydraulic motor 27 will cause the entire assembly to move vertically within the box 11 as shown by the double-headed arrow B.

The invention includes means for supporting the auger 19 such that the forward or delivery end of the auger may be raised and lowered relative to the above described transverse support assembly at any point along the transverse movement of the auger. As best shown in FIG. 1, a support arch 43 is disposed across the box 11 in a vertical plane proximate to the juncture of the floor 12 and the cross conveyor 17. The support arch 43 includes a pair of leg portions 44 and 45 which are internally threaded so as to receive vertically disposed screw shafts 46 and 47, respectively. The screw shafts 46 and 47 are externally threaded such that conjoint rotation of the same will move the support arch 43 vertically with respect to the box 11. The drive system for the screw shafts 46 and 47 is exactly the same as that disclosed for the screw shafts 20 and 21 as above described. A hydraulic motor 48 may be utilized to rotate the screw shaft 46 and 47 and thus serve the same function as the hydraulic motor 27 illustrated in FIGS. 1 and 2.

As shown generally in FIG. 1 and more specifically in FIG. 3, the forward or delivery end of the auger 19 is suspended from the support arch 43. A bearing assembly 49 rotatably supports the forward end of the auger and an arm 50 extends upwardly from the bearing assembly 49 proximate to the arch 43. A pair of rollers 51 and 52 are mounted on the arm 50 so as to be disposed on top and bottom surfaces respectively of the arch. Accordingly, the forward end of the auger is raised and lowered in response to raising and lowering of the arch. Moreover, the rollers 51 and 52 permit the auger 19 to move transversely within the box 11 in substantially parallel relation to the side walls 13 and 14.

It will be understood that the various hydraulic motors may be coupled to the hydraulic power source of a tractor pulling the forage wagon and operated through suitable controls.

OPERATION

Prior to the loading operation, the hydraulic motors 27 and 48 will be simultaneously actuated so as to raise the auger 19 to its highest position. The forage wagon will then be loaded in the conventional manner so that the auger 19 will be disposed on top of the upper level of the load of material.

The unloading operation is started by actuating the hydraulic motor 18 which drives the cross conveyor 17. Accordingly, any of the material deposited on the cross conveyor 17 will be discharged through the side wall 13 in the conventional manner. The hydraulic motor 39 is then actuated so as to rotate the auger 19 about its longitudinal axis. This causes the material to be conveyed longitudinally of the wagon so that the same will fall onto the operating cross conveyor 17. In order to unload the material in a uniform manner, the hydraulic motor 42 may be actuated so as to move the auger 19 alternately back and forth across the box 11 in the directions of the double-headed arrow A in FIG. 2. As above explained, the rollers 51 and 52 permit the forward portion of the auger 19 to move across the wagon box in conjunction with similar movement of the rearward portion of the auger. In order to maintain the auger 19 in conveying relation with the top of the material being unloaded, the hydraulic motors 27 and 48 are actuated to lower the auger within the box 11.

The modified embodiment of FIGS. 5 through 9 will now be described. Referring first to FIG. 5 the forage feeder of the embodiment includes a wheeled chassis 53 on which a box 54 is mounted. The box 54 includes a floor 55 and side walls 56 and 57 oriented parallel to the longitudinal axis of the box. A rear wall 58 and front wall 59 close the ends of the box which may be constructed of conventional materials in accordance with conventional practice. A cross conveyor 60 is mounted across the bottom of the box 54 proximate to the front end wall 59. The cross conveyor 60 may be of the slatted chain type or an auger type (not shown) or the belt type as illustrated and serves to discharge material from the forage wagon through the side wall 56, all in the conventional manner. In the illustrated embodiment of the invention the cross conveyor 60 is adapted to be powered by a hydraulic motor shown at 61.

In accordance with a feature of the present embodiment an auger 62 is mounted on the box 54 and is disposed longitudinally with respect to the wagon above a load of material to be carried within the wagon. The auger 62 is adapted to be drivingly supported within the box 54 so as to be maintained in conveying relation with the material to be unloaded from the box. The assembly for drivingly supporting the auger 62 includes a pair of vertically extending tracks 63 and 64 extending upwardly adjacent to the side walls 56 and 57 respectively. As shown in FIG. 6 each of the tracks 63 and 64 includes a plurality of convex projections 65 spaced uniformly to define a plurality of concave notches 66 therebetween. The function of the tracks 63 and 64 will become clear as the description proceeds.

The assembly for drivingly supporting the auger 62 further includes a horizontally disposed bar 67 extending transversely across the box 54. A pair of sprockets 68 and 69 are mounted on a pair of shafts 70 and 71 respectively, mounted at the opposite ends of the bar 67. A chain 72 is mounted on the sprockets 68 and 69 so as to extend transversely within the box 54 as shown.

A pair of pawls 73 and 74 are journalled on the shafts 70 and 71 respectively and are disposed between the bar 67 and the respective sprockets 68 and 69. Each of the pawls 73 and 74 includes a plurality of circumferentially spaced radially extending fingers or lobes 75 having convex end surfaces complementary to the shape of the concave notches 66. As will be seen in FIG. 6 the pawls 73 and 74 are positionable so that the lowermost lobe of each is receivable on a projection 65 of the respective tracks 63 and 64. Accordingly the above described horizontally extending support assembly is supported on the tracks 63 and 64.

The auger 62 is adapted to be coupled to the above described structure so as to be movable transversely with respect to the wagon while being rotated about its longitudinal axis. As best shown in FIG. 7, the hydraulic motor 76 is coupled to the shaft of the auger 62 at the rearward end thereof. A boss 77 extends upwardly from the motor 76 so as to be coupled to the lower run of the chain 72 by means of a pin 78. A hydraulic motor 79 is mounted on the bar 67 and is arranged to rotate the shaft 70. The sprocket 69 is coupled to the shaft 70 such that operation of the motor 79 drives the sprocket 69. It will thus be seen with reference to FIG. 6 that operation of the motor 79 will cause the auger to move transversely within the box 54 in the direction of the double-headed arrow A. Operation of the motor 76 causes the auger 62 to rotate about its longitudinal axis.

As shown generally in FIGS. 5 and 6 a cam plate 80 is mounted on the auger support structure. As shown in FIG. 7 the cam plate 80 is secured to the boss 77 and extends upwardly between the bar 67 and chain 72 so as to be disposed in alignment with the pawls 73 and 74. The cam plate 80 is formed to include camming surfaces 81 and 82 on opposite ends thereof respectively. The camming surfaces are inclined upwardly and outwardly in diverging relation as shown.

It will be understood that the various hydraulic motors may be coupled to the hydraulic power sources of a tractor pulling the forage wagon and operated through suitable controls.

OPERATIONS

Prior to the loading operation the auger 62 will be raised to its highest position within the box 54. The forage wagon will then be loaded in the conventional manner so that the auger 62 will be disposed above the upper level of the load of material.

The unloading operation is started by actuating the hydraulic motor 61 which drives the cross conveyor 60. Accordingly any of the material deposited on the cross conveyor 60 will be discharged through the side wall 56 in the conventional manner. The hydraulic motor 76 is then actuated so as to rotate the auger 62 about its longitudinal axis. This causes the material to be conveyed longitudinally of the wagon so that the same will fall onto the operating cross conveyor 60. In order to unload the material in a uniform manner the hydraulic motor 79 is actuated so as to move the auger 62 transversely across the box 54 in the direction of the double-headed arrow A in FIG. 6.

The auger 62 is movable vertically toward the floor of the forage wagon in a manner now to be described. As above mentioned the horizontally extending structure supporting the auger 62 is supported on the tracks 63 and 64. This is due to the engagement of the lowermost lobe 75 of each of the pawls on a respective one of the projections 65 as shown in FIG. 6. As the auger is moved to the right as viewed in FIG. 6 the camming surface 82 of the cam plate 80 engages the inwardly extending lobe 75A of the pawl 74 as shown in FIG. 8. This causes the pawl to rotate about the shaft 71 in the direction of the arrow B thereby swinging the lobe 75 out of its holding engagement on projection 65 and outwardly toward the notch 66. At this point the motor 79 (FIG. 7) is reversed to drive the auger and associated cam plate in the direction of arrow C in FIG. 9. The pawl 74 is thus permitted to continue rotating in the direction of arrow B and thus lowering the assembly relative to the track 64 in the direction of arrow D. The pawl continues to rotate until the lobe 75A engages the next lower one of the projection 65 to again assume the holding position shown generally in FIG. 6.

It will be understood that the leftmost end of the horizontally extending support assembly will be lowered in the same manner upon the engagement of the camming surface 81 with the pawl 73. Thus the assembly is indexed downwardly in a step-by-step manner in response to traversing or oscillating of the auger back and forth across the box 54. In this manner the auger conveys the material from the top of the load in a uniform flow forwardly toward the cross conveyor 60.

From the foregoing, it will be appreciated that the forage wagon of the invention realizes advantages heretofore unattainable with conventional forage wagons.

Various changes falling within the scope and spirit of the invention may occur to those skilled in the art. The invention is, therefore, not to be thought of as limited to the specific embodiments set forth.

What is claimed is:

1. A self-unloading wagon having a floor, oppositely disposed side walls extending upwardly from the floor, and a pair of spaced end walls defining an open-top box adapted to contain a load of forage, wherein the improvement comprises: conveyor means comprising an auger extending longitudinally of said wagon; means mounting said auger on said wagon above a load of forage to selectively position said auger for transferring forage longitudinally of the wagon toward one of said end walls; said mounting means including means for vertically positioning and tilting said conveyor means in a plurality of angulate positions relative to the floor of said wagon; and power means for simultaneously moving said conveyor means transversely across said box, whereby said auger is movable vertically at any point within its transverse movement and is movable transversely at any point within its vertical movement to provide optimum conveying of forage from the top of the load.

2. The subject matter of claim 1, in which said mounting means includes a vertical support assembly on said wagon and a transverse support assembly carried on said vertical support assembly, said conveyor means being mounted on said transverse support assembly, whereby said conveyor means is movable vertically and transversely in response to actuation of said vertical and said transverse support assemblies.

3. The subject matter of claim 2, wherein said vertical support assembly includes a pair of rotatably driven screw shafts extending upwardly into said box adjacent to said side walls, an internally threaded follower mounted on each of said shafts for vertical movement in response to rotation of each respective shaft, said transverse support assembly including a gear rotatably mounted on each of said followers and an endless chain mounted on said gears so as to extend transversely of the wagon, said conveyor means being mounted on said chain, whereby said conveyor means is moved vertically in response to rotation of said screw shafts and is moved transversely in response to rotation of said gears.

4. The subject matter of claim 2, wherein said transverse support assembly extends across substantially the entire distance between said side walls, whereby said conveyor mean conveys forage from substantially the entire width of the load of forage in said box.

5. The subject matter of claim 1, including a cross conveyor disposed transversely within said box adjacent to said one end wall for receiving forage from said conveyor means to transfer the forage from the wagon.

6. The subject matter of claim 5, wherein said cross conveyor is disposed proximate to said floor whereby forage conveyed by said conveyor means falls onto said cross conveyor.

7. A self-unloading forage feeder comprising: a wagon having a bottom, a pair of spaced side walls, and a pair of spaced end walls, said wagon adapted to carry a load of forage, vertically extending support means adjacent one of said end walls, horizontally extending support means movably supported by said vertically extending support means, and conveyor means movably supported by said horizontally extending support means and extended toward the other of said end walls, said support means having cooperating index means actuable for moving said horizontally extending support means in the vertical direction, said horizontally extending support means including endless movable means actuable for oscillating horizontal movement to which conveyor support means is attached, said conveyor means being supported by said conveyor support means and being actuable for conveying forage toward the other of said end walls, said conveyor means comprising an independently actuable auger carried by said conveyor support means, said horizontally extending support means comprising an independently actuable endless chain which is movable about a pair of sprockets and which carries said conveyor support means, said indexing means including cooperating protrusions on at least one of said sprockets and protrusion-receiving notches on said vertically extending support means, said protrusions being engageable by said conveyor support means for indexing vertical movement of said horizontally extending support means.

8. A self-unloading forage feeder comprising: a wagon having a bottom, a pair of spaced side walls, and a pair of spaced end walls, said wagon adapted to carry a load of forage, vertically extending support means adjacent one of said end walls; horizontally extending support means movably supported by said vertically extending support means; conveyor means movably supported by said horizontally extending support means and extending toward the other of said end walls; means for actuating said horizontally extending support means to move said conveyor means transversely across said wagon; cooperating indexing means including protrusions on said horizontally extending support means and protrusion-receiving notches defined on said vertically extending support means receiving said protrusions to support said horizontally extending support means for vertical movement relative to said vertically extending support means; and cam means on said horizontally extending support means for engaging said protrusions to index said horizontally extending support means vertically on said vertically extending support means, whereby said conveyor means is movable vertically within said wagon.

9. A self-unloading wagon having a floor, oppositely disposed side walls extending upwardly from the floor, and a pair of spaced end walls defining an open-top box adapted to contain a load forage, wherein the improvement comprises: conveyor means on said wagon above the load of forage for transferring forage longitudinally of the wagon toward one of said end walls; horizontally disposed means for supporting and moving said conveyor means transversely across said box, said horizontally disposed means including pawl means journalled thereon; vertically extending support means in said box including a plurality of vertically spaced notches engageable by said pawl means to support said horizontally disposed means for vertical movement thereon; and cam means on said horizontally disposed means for engaging said pawl means to index said horizontally disposed means vertically on said notches whereby said conveyor means is movable vertically within said box.

10. The subject matter of claim 9, wherein said horizontally disposed means includes a pair of sprockets and an endless chain mounted thereon so as to extend transversely of said box, means mounting said conveyor means on said chain whereby rotation of said sprockets moves said conveyor means transversely across said box.

11. The subject matter of claim 9, wherein said pawl means includes a pair of rotatable members mounted on opposite ends respectively of said horizontally disposed means, each of said members including a plurality of radially disposed lobes receivable in said notches and engageable by said cam means to rotate said members along said notches.

12. A self-unloading wagon having a floor, oppositely disposed side walls extending upwardly from the floor, and a pair of spaced end walls defining an open-top box adapted to contain a load of forage, wherein the improvement comprises: conveyor means; means mounting said conveyor means on said wagon above a load of forage to selectively position said conveyor for transferring forage longitudinally of the wagon toward one of said end walls; said mounting means including means for vertically positioning and tilting said conveyor means in a plurality of angulate positions relative to the floor of said wagon; and power means for simultaneously moving said conveyor means transversely across said box, whereby said conveyor means is movable vertically to said angulate positions at any point within its transverse movement and is movable transversely at said angulate positions to provide optimum conveying of forage from the top of the load.

13. The subject matter of claim 12, wherein said conveyor means includes an auger extending longitudinally of the wagon and rotatable about its longitudinal axis to convey forage longitudinally toward said one end wall.

14. The subject matter of claim 13, in which said mounting means includes a first and second vertical support assembly mounted in spaced relation on said wagon and a transverse support assembly carried on said first vertical support assembly, said conveyor means being mounted on said transverse support assembly; said assemblies having means for selectively tilting said conveying means to said angulate positions whereby said conveyor means is movable vertically and transversely in response to actuation of said vertical and said transverse support assemblies.

References Cited

UNITED STATES PATENTS

| | | |
|---|---|---|
| 940,583 | 11/1909 | Capers. |
| 2,679,953 | 6/1954 | Field. |
| 3,212,652 | 10/1965 | Roberts. |
| 3,325,028 | 6/1967 | Kenning. |

ALBERT J. MAKAY, Primary Examiner

U.S. Cl. X.R.

198—126; 214—17, 83.26, 83.32